United States Patent Office 2,917,457
Patented Dec. 15, 1959

2,917,457
LUBRICATING GREASE CONTAINING AN INORGANIC GELLING AGENT AND A POLYLACTAM

Donald M. Preiss, Concord, Calif., assignor to Shell Development Company, New York, N.Y., a corporation of Delaware No Drawing. Application August 27, 1956
Serial No. 606,190

8 Claims. (Cl. 252—28)

This invention relates to the thickening of oleaginous liquids by means of finely divided inorganic gelatinous material and is especially directed to greases employing inorganic gelling agents for use in high temperature applications.

Although lubricating greases, by ASTM definition, are semi-solid or solid combinations of a petroleum product and a soap or a mixture of soaps, there have been developed a number of compositions which do not employ petroleum oils as the base constituent. Also, a number of thickeners for these liquids which are non-soap gelling agents can be used in the preparation of thickened compositions which functionally are the equivalent of a true lubricating grease. Furthermore, the lubricating compositions thus prepared have properties in which soap-containing petroleum base lubricating greases are generally deficient. In spite of the fact that the composition of this invention does not conform to the conventional definition of a grease, it will hereinafter be included in this category in order to facilitate the discussion of the instant invention.

Gelling agents which are not soaps and which have found considerable application in the preparation of lubricating greases include amorphous gels, such as silica, and those of crystalline structure, such as clays. These materials when dispersed in a suitable liquid medium including petroleum oil lubricating fractions or synthetic lubricants produce gelatinous compositions with a grease-like structure having lubricating properties. Greases employing inorganic gelling agents can be prepared in the standard type of grease-making equipment without ordinarily requiring unusual processing conditions. Although the greases thickened with inorganic gelling agents are suitable for multi-service duty, their resistance to changes in consistency over a wide temperature range make them very desirable compositions for high temperature applications. While the consistency of soap thickened greases at elevated temperatures rapidly deteriorates, greases thickened with inorganic gelling agents retain their grease structure.

A serious deficiency in most inorganic grease compositions comprises their sensitivity to the presence of or contact with water. This characteristic can be fatal, because exposure of a simple admixture of the inorganic gelling agent and oil to water results in the rapid disintegration of the mixture into its component parts. However, this difficulty may be overcome by treating the gelling agents employed in the preparation of these greases with suitable reagents so as to stabilize the compositions against the detrimental effect of water.

Many of such water stabilizing ingredients include oleophilic surface-active agents and more particularly, oleophilic amines. However, it has been found that most of such materials are sensitive to thermal disintegration or decomposition and while stabilizing the greases with respect to disintegration by water at ordinary temperatures, are virtually useless if temperatures in the order of 250° C. or higher are encountered. For the latter purpose, a number of special gelling agents may be utilized but these are expensive materials and hence for most commercial purposes are impractical. Polymeric coating agents may be employed but in many instances these also are thermally unstable or tend to soften under the influence of heat. Moreover, the other mechanical properties of the grease are sometimes adversely affected by the presence of polymeric coating agents for the inorganic gelling materials.

It is, therefore, an object of this invention to thicken an oleaginous liquid with an inorganic gelling agent to prepare a gelatinous composition which resists dispersion when in contact with water and, moreover, resists the adverse effects of elevated temperatures. These and other objects will be made apparent from the following discussion of the instant invention.

According to this invention, hydrophobic gelatinous compositions having lubricating properties can be prepared by incorporating into an oleaginous base an inorganic hydrophilic gelling agent and a polylactam, the latter constituent functioning as a thermally stable waterproofing agent for the gelling agent. In carrying out this invention, it is preferred that the monomeric lactam be employed in order to facilitate the manufacture of the composition. By the use of the present invention, it has been found possible to not only produce a grease composition resistant to the action of water and the deleterious influences of heat, but also the presence of the polymerized lactam reduces the amount of gelling agent required to produce a grease composition of a given consistency compared with greases containing the same gelling agent and lubricant but water-proofed by means of other materials.

The lactams useful for incorporation in the compositions of this invention are those of a monoaminomonocarboxylic acid having a chain of at least five carbon atoms between the carboxyl and the amino group. If a fewer number of carbon atoms separate the amino and carboxyl groups, then polymerization of the corresponding lactams occurs only to a very limited extent.

Lactams which are of importance for the invention are, for instance, the following: cyclohexanone isoxime, the products of conversion or rearrangement of 2-methylcyclohexanone oxime, of 3-methylcyclohexanone oxime and 4-methylcyclohexanone oxime, cycloheptanone isoxime, the products of rearrangement of 2-methylcycloheptanone isoxime, 2-ethylcycloheptanone oxime, cyclooctanone isoxime. Preferred lactams include: epsilon-caprolactam and the homologous eight-membered lactams such as suberone isoxime. It is preferred that the ring members be restricted in number to no more than about 14, since those having greater ring structures show a decreased tendency to polymerize. The polylactam should be utilized in an amount between about 5% and about 250% by weight, based on the inorganic gelling agent.

While the present invention is especially directed to extreme high temperature lubricating greases, they may be employed for normal operating conditions as well. Hence, and especially useful at operating conditions below about 400° F., any of the well-known lubricating oils may be utilized. These include mineral oil lubricants and synthetic lubricating oils of known types, such as the phosphorus esters, silicon esters and aliphatic esters formed by esterification of aliphatic dicarboxylic acids with monohydric alcohols. Typical species of these materials include tricresyl phosphate, dioctyl phthalate, bis-(2-ethylhexyl)sebacate, tetra(2-ethylhexyl)silicate, and the like.

Lubricants to be employed at temperatures in excess of about 400° F. are those having an inherent high thermal stability including the halocarbons and organosilicon fluids. The halocarbons may be those described in Peterson et al. patent, U. S. 2,679,479, and include especially the fluorocarbon oils, preferably distilling above about 200° C. at atmospheric pressure. The most useful class of lubricants for grease compositions to be utilized at temperatures in excess of about 400° F. include the organo-substituted silicon fluids of lubricating oil viscosity. Liquid organo-silicon polymers which are adapted for the preparation of the subject high temperature grease compositions may be obtained by the hydrolysis and chemical condensation of one or more hydrolyzable silicon compounds having the general formula $R_2SiX_2$, wherein R is a lower alkyl radical and X is a hydrolyzable group selected from the class consisting of halogen and alkoxy groups. They may also be obtained by the hydrolysis and chemical condensation of a mixture of alkylated silicon compounds containing at least 75 mol percent of such dialkyl silicon compounds having the general formula $R_2SiX_2$ and not more than 25 mol percent of a monoalkyl silicon compound having the formula $RSiX_3$, or a total of not more than 25 mol percent of both such monoalkyl silicon compound and a trialkyl silicon compound having the formula $R_3SiX$. In all of these formulae, R and X have the meanings stated above. In general, the hydrolyzable silicon compound or mixture of such compounds from which the liquid organo-silicon polymers may be prepared is one having an average composition corresponding to the formula $R_{4-z}SiX_z$, wherein z is a whole or a fractional number from 2.25 to 1.5 and R and X have the meanings given above.

Examples of hydrolyzable dialkyl silicon compounds which may be used in preparing the liquid organo-silicon polymers are dimethyl silicon dichloride, methyl ethyl silicon dichloride, diethyl silicon dichloride, methyl propyl silicon dichloride, dimethyl silicon dibromide, diethyl silicon dibromide, dimethyl-dimethoxy-silicon, diethyldiethoxy-silicon, dimethyl-diethoxy-silicon, etc. Examples of the hydrolyzable monoalkyl silicon compounds and hydrolyzable trialkyl silicon compounds which may be present together with the dialkyl silicon compound in amount not exceeding 25 mol percent of the mixture are methyl silicon trichloride, ethyl silicon tribromide, ethyl silicon trichloride, propyl silicon trichloride, methyl-trimethoxy-silicon, methyl-triethoxy-silicon, ethyl-triethoxy-silicon, trimethyl silicon chloride, trimethyl silicon bromide, triethyl silicon chloride, trimethyl-methoxy-silicon, trimethyl-ethoxy-silicon, triethyl-ethoxy-silicon, etc.

For purposes of the present invention, only those polymers which are high boiling liquids within the lubricating oil viscosity range are suitable. These generally possess a viscosity at 100° F. which is within the range of from about 25 to about 3500 SSU. It is preferred, for purposes hereof, to employ such oils as have a viscosity at 100° F. of from about 300 SSU to about 1250 SSU. Such products are generally colorless and inert, have a very low volatility and undergo relatively slight change in viscosity for a given change in temperature. Relatively common oils of this type are dimethyl-silicone polymer, phenylmethylsilicone polymer, chlorophenylmethylsilicone polymer, etc., it being preferred to employ the phenylmethyl silicone polymer in accordance herewith. Methods of preparing such compounds are taught in numerous patents, e.g. U.S. 2,410,346, U.S. 2,456,496, and in the literature such as "Chemistry of the Silicones" by Rochow, page 61 et seq. A particularly desirable phenylmethylsilicone polymer for use in accordance with the present invention is Dow-Corning 550 silicone fluid, a product of Dow-Corning, Inc., which has a viscosity at 100° F. of about 300 to about 400 SSU. Other suitable types of silicone oils include halogen-substituted silicones, such as chlorinated or fluorinated silicones. Two commercial products of this type are GE 84106, sold by General Electric Company, and DC–F–4050 sold by Dow-Corning, Inc.

The gelling agents to be employed comprise inorganic colloidal materials having either an amorphous or crystalline structure. The amorphous colloids include especially silica, alumina, magnesia, ferric oxide, nickel sulfide and mixtures thereof, such as silica-magnesia, as well as certain dyes such as the indogen (indigo) dyes and indanthrene dyes. These may be incorporated in the form of highly oil absorptive gels typified by those obtained with the "aerogel" process, such as described in Kistler patent. U.S. 2,260,625. They may be prepared, for example, not only by the aerogel process but also by solvent transfer processes wherein a hydrogel is formed and the water eliminated therefrom by displacement with a water-miscible solvent such as acetone, the water-miscible solvent then being displaced with the lubricating oil to be employed in the final composition.

In place of or in addition to the amorphous colloids, crystalline gels such as molybdenum disulfide and, more especially, clay-like colloids may be employed and this latter class is preferred due to their relatively inert character at the high operating temperatures which are especially contemplated in this invention. While the clays of low base exchange capacity, such as Georgia clay, attapulgite and the like, may be utilized, it is preferred that a high base exchange clay such as Wyoming bentonite or hectorite be employed. These are preferably prepared by dispersing the crude clay in water to form a hydrosol from which the undesirable gangue is separated by sedimetation or centrifuging. The purified clay hydrosol, preferably containing from 1 to about 10% by weight of clay, is then treated as described more fully hereinafter for the formation of the subject grease compositions.

Several methods of preparation of the subject grease-like compositions are possible. Where the inorganic gelling agent possesses an expanded porous structure, suitable for the formation of grease structures as in the case of aerogels and other low density structures, it is simply necessary to incorporate the gelling agent in the lubricating oil and to add thereto the lactum either before or after such incorporation, following which the composition is heated at a polymerization temperature for a time sufficient to polymerize the lactum to form a polylactam having a molecular weight no less than about 500. Normally, this requires heating the lactam-containing ingredients for a period of 1–48 hours at a temperature between about 100 and about 500° F.

Other methods may be necessary or preferable for the sake of efficiency or for the reason that particular gelling agents are most effectively combined with the oil by such other means. For example, the so-called direct transfer process constitutes a preferred means for the transfer of the gelling agent from an aqueous system into the oil when it is not objectionable to supplement the polylactam by the presence of another hydrophobic surface-active agent such as an amino compound containing at least 18 carbon atoms per molecule. This is true, for example, in greases which are designed to operate at temperatures below about 250° C. However, where higher temperatures are to be encountered, the supplementary cationic surface-active agent is undesirable since it tends to decompose at a rate greater than that of the other components of the grease.

Under these circumstances, it is preferred to disperse the gelling agent in water, replace the water with a miscible volatile organic compound such as an alcohol or acetone, and displace the organic solvent with the oleaginous lubricating liquid. The lactam is preferably added while the gelling agent is in the aqueous medium. However, it can be added to the gelling agent during the alcogel stage or following the addition of the oleaginous liquid. In any case, the completed composition, subsequent to elimination of the volatile organic solvent, is heated to a polymerization for the time and temperature specified hereinbefore, so as to result in the polymerization of the polylactam on the surfaces of the gelling agent.

When utilizing the gelling agents of crystalline structure such as the clays and the like, it is preferred that strong mineral acids be added thereto prior to incorporation of the lactam. The presence of the acid appears to promote the gelling characteristics of the clay. The strong mineral acid may be phosphoric, nitric or sulfuric acid, although phosphoric acid is preferred due to its relatively good corrosion performance in contact with metals. The acid may be used in amounts from about 2 to 10% by weight of the clay and preferably in amounts from about 5 to 7.5%.

The example which follows illustrates the present invention:

Example

A 2% aqueous slurry of hectorite clay from which the gangue has been separated is acidified by the addition thereto of 7%, based on the weight of the clay, of 85% phosphoric acid. To this mixture is added 100% by weight, based on the clay, of epsilon-caprolactam. The coated clay produced thereby was dehydrated by replacement of the water with isopropyl alcohol through a series of filtrations and alcohol washes. The alcohol was then displaced by the addition of an oily phenylmethyl polysiloxane, known commercially as Dow-Corning DC-550 silicone oil. The alcohol was removed from the mixture by evaporation. The grease was then heat treated at a temperature of between 400 and 450° F. for about 12 hours, preferably in a nitrogen atmosphere although the latter is not essential. Polymerization of the lactam occurred on the surface of the clay and the grease so produced was highly resistant to disintegration in the presence of water. In order to study the operating characteristics of the grease, a bearing operating at 10,000 r.p.m. and at a temperature of 500° F. was run to freezing while lubricated with the above-described grease. Proper operation continued for a space of at least 80 hours. When held at a temperature of 300° F. for two hours, a static sample of the grease showed bleeding of about 3% by weight of the lubricating oil. A thin film of the grease spread on a metallic plate and placed in a forced draft oven at 450° F. lost 18% by weight after 24 hours, the appearance of the grease after this period of heating being substantially unchanged.

I claim as my invention:

1. A gelatinous composition having lubricating qualities consisting essentially of a major portion of a lubricating oil having a viscosity at 100° F. of 25 to 3500 SSU and having incorporated therein a sufficient amount of a colloidally dispersed high base exchange clay to produce a gelatinous composition of grease-like consistency, the surfaces of said clay being treated with a polymerized lactam of a monoaminomonocarboxylic acid having a chain of at least 5 carbon atoms between the carboxyl and the amino group, said polymerized lactam having a molecular weight of at least 500 and being present in an amount sufficient to impart water resistance characteristics to said composition.

2. A composition according to claim 1 wherein the clay is a hectorite clay.

3. A composition according to claim 1 wherein the lubricating oil is a liquid organo polysiloxane.

4. A composition according to claim 1 wherein the lactam has a chain of 5 carbon atoms between the carboxyl and the amino group.

5. A gelatinous composition having lubricating qualities consisting essentially of a major portion of an oleaginous liquid aryl alkyl polysiloxane having a viscosity at 100° F. of 25 to 3500 SSU and having incorporated therein a sufficient amount of a colloidally dispersed clay to produce a gelatinous composition of grease-like consistency and 5–250% by weight, based on said clay, of a polymerized lactam of a monoaminomonocarboxylic acid having a chain of 5 carbon atoms between the carboxyl and the amino group, said polymerized lactam imparting water resistance characteristics to said composition.

6. A gelatinous composition having lubricating qualities consisting essentially of a major portion of an oleaginous liquid phenylmethyl polysiloxane having a viscosity at 100° F. of 25 to 3500 SSU and having incorporated therein 2–20% by weight, based on the total composition, of a colloidally dispersed hectorite clay and 5–250% by weight, based on said clay, of polymerized epsilon-caprolactam wherein the surfaces of said clay are treated with said polymerized lactam to impart water resistance characteristics to said composition.

7. A composition according to claim 6 containing in addition between about 2% and about 10%, based on the total composition, of a mineral acid.

8. A composition according to claim 7 wherein the acid is phosphoric acid.

References Cited in the file of this patent

UNITED STATES PATENTS 2,756,212    Hotten _____ July 24, 1956

FOREIGN PATENTS 711,495    Great Britain _____ July 7, 1954